UNITED STATES PATENT OFFICE 2,514,649

METHINE DYES CONTAINING A PYRIMIDAZOLONE GROUP

Edward Bowes Knott, Harrow Wealdstone, England, assignor to Eastman Kodak Company, Rochester, N. Y., a corporation of New Jersey No Drawing. Application December 29, 1948, Serial No. 68,091. In Great Britain January 23, 1948

16 Claims. (Cl. 260—240.2)

This invention relates to the manufacture of dyes, particularly dyes for use in photographic materials.

As is well known, in order to make a photographic emulsion sensitive to light of a wide range of wavelengths, it is necessary to add a sensitizing dye or mixture of sensitizing dyes to the emulsion. Dyes used in current practice, however, have the disadvantage that they are not always wholly removable by washing from the emulsion after it has been exposed, and consequently a faint but permanent stain remains, which is often objectionable, especially when the emulsion is coated on paper.

Dyes are also used in photographic materials in filter or antihalation layers. In these cases, the dye should be capable of being destroyed or bleached out easily. Among the dyes proposed for this purpose are the oxonol dyes, which contain the following structure:

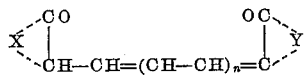

where $n$ represents 0 or a small integer, and X and Y represent the atoms necessary to complete cyclic systems which may be the same or different. The structure may also be represented as

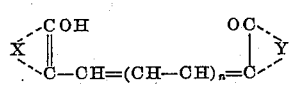

where $n$, X and Y have the same meanings as before.

I have now found a new class of dyes, some of which can be used as non-staining, sensitizing dyes, and some of which can be used as filter dyes, or can be incorporated in antihalation layers. My new dyes are distinguished in that they contain a pyrimidazolone (2-keto-2, 3-dihydropyrimidazole) nucleus, i. e. the nucleus which can be represented by the following formula:

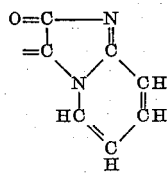

This nucleus is linked through a methine or polymethine chain, attached to the 3-carbon atom of the pyrimidazolone nucleus, to various nuclei, such as another pyrimidazole nucleus (oxonol dye) or a heterocyclic basic nucleus, e. g. pyridine, quinoline, benzoxazole, thiazoline, benzothiazole, etc. (merocyanine dye).

It is, therefore, an object of my invention to provide new methine and polymethine dyes containing a pyrimidazolone group and methods for preparing these dyes. Another object is to provide methine and polymethine dyes containing a pyrimidazolone nucleus which are useful in sensitizing photographic silver-halide emulsions. Still another object is to provide photographic silver-halide emulsions containing these new dyes. A still further object is to provide new methine and polymethine dyes containing a pyrimidazolone group which are useful as filter dyes and in the preparation of antihalation layers. Another object is to provide photographic elements comprising these new dyes. Other objects will become apparent from a consideration of the following description and examples.

The methine or polymethine dyes of my invention containing a pyrimidazolone group can be represented by the following two general formulas:

I 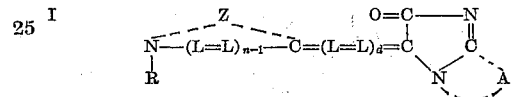

and

II 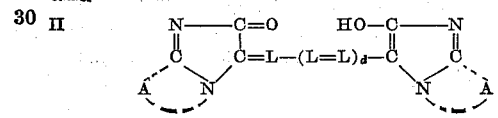

wherein R represents an alkyl group, e. g. methyl, ethyl, n-propyl, isopropyl, n-butyl, isobutyl, etc. groups (e. g. an alkyl group of the formula $C_nH_{2n+1}$ wherein $n$ is a positive integer from 1 to 4), L represents a methine group (both substituted and unsubstituted), A represents the non-metallic atoms necessary to complete a heterocyclic nucleus of the pyridine series, Z represents the non-metallic atoms necessary to complete a heterocyclic nucleus containing from 5 to 6 atoms in the heterocyclic ring, such as those of the thiazole series (e. g. thiazole, 4-methylthiazole, 4-(2-thienyl)thiazole, 4-phenylthiazole, etc. nuclei), the benzothiazole series (e. g. benzothiazole, 5-chlorobenzothiazole, etc. nuclei), the naphthothiazole series (e. g. α-naphthothiazole, β-naphthothiazole, etc. nuclei), the benzoxazole series (e. g. benzoxazole, etc. nuclei), the naphthoxazole series (e. g. α-naphthoxazole, β-naphthoxazole, etc. nuclei), the selenazole series (e. g. 4-methylselenazole, 4-phenylselenazole, etc. nuclei), the benzoselenazole series (e. g. benzoselenazole, 5-chlorobenzoselenazole, etc. nuclei), the naphthoselenazole series (e. g. α-naphthoselenazole, β-naphthoselenazole, etc., nuclei), the thiazoline series (e. g. thiazoline, etc. nuclei), the 3,3-dialkylindolenine series (e. g. 3,3-dimethylindolenine, etc. nuclei), the benzimidazole series (e. g. 1,3-dimethylbenzimidazole, 1,3-diethylbenzimidazole, etc. nuclei), the pyridine series (e. g. pyridine, hydropyridine, etc. nuclei), the quinoline series (e. g. quinoline, 6-ethoxyquinoline, 6-methylquinoline, etc. nuclei), etc., and $d$ and $n$ each represents a positive integer from 1 to 2.

The methine dyes of my invention represented by Formula I above can conveniently be prepared by condensing a cyclammonium quaternary salt containing in the α- or γ-position a substituent selected from the group consisting of β-arylaminovinyl and δ-arylamino-$\Delta^{1,3}$-butadienyl groups, e. g. a cyclammonium quaternary salt selected from those represented by the following general formula:

III

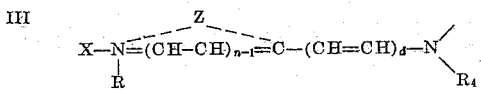

wherein R, Z, n and d have the values set forth above, X represents an anion, e. g. $Cl^-$, $I^-$, $Br^-$, $SCN^-$, $ClO_4^-$, $CH_3COO^-$, $p\text{-}CH_3C_6H_4\text{---}SO_3^-$, $C_6H_5\text{---}SO_3^-$, $CH_3OSO_3^-$, $C_2H_5OSO_3^-$, etc., $R_3$ represents an aryl group, e. g. a phenyl, a diphenyl, a xylyl or a naphthyl (α or β) group (e. g. an aryl group containing from 6 to 12 carbon atoms), $R_4$ represents a hydrogen atom or an acyl group of a carboxylic acid, such as acetyl, propionyl, benzoyl, etc. groups (especially an acyl group of an aliphatic carboxylic acid), with an alkali metal salt form or an acid addition salt of a pyrimidazolone compound represented by the following general formula:

IV

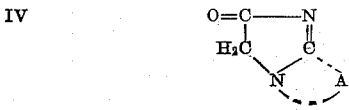

wherein A has the value set forth above. The compounds represented by Formula III can be readily obtained by reacting a quaternary salt selected from those represented by the following general formula:

V

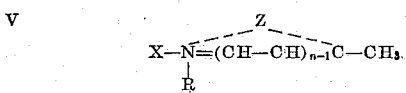

wherein R, Z, X and n have the values set forth above, with a compound selected from those represented by the following general formula:

VI

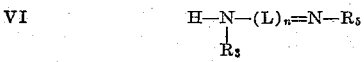

wherein $R_3$ and L have the values set forth above, $R_5$ represents an aryl group, such as a phenyl group, a diphenyl group, a xylyl group, a naphthyl (α or β) group, etc. (e. g. an aryl group containing from 6 to 12 nuclear carbon atoms), and $n$ represents a positive odd integer from 1 to 3, in the presence or absence of a carboxylic acid anhydride, e. g. acetic anhydride, propionic anhydride, n-butyric anhydride, etc. The condensation of quaternary salts with a diaryl formamidine (e. g. diphenylformamidine) in the presence or absence of a carboxylic acid anhydride (e. g. acetic anhydride) is described in detail in British Patent 344,409, accepted March 4, 1931. A similar method is outlined in White et al, U. S. Patent 2,263,749, dated November 25, 1941, wherein other compounds represented by Formula VI are reacted with various quaternary salts. The concomitant or subsequent acylation of such reaction products is also described in the White et al. patent.

Typical cyclammonium quaternary salts represented by Formula III above, include, for example, 2-(β-acetanilidovinyl)-quinoline ethiodide, 2-(β-acetanilidovinyl)benzoxazole ethiodide, 2-(β-acetanilidovinyl)thiazoline ethiodide, 2-(β-acetanilidovinyl)-benzothiazole ethiodide, 2-(β-acetanilidovinyl)pyridine methiodide, 4-(β-acetanilidovinyl)pyridine ethiodide, 2-(δ-acetanilido-$\Delta^{1,3}$-butadienyl)benzoazole ethiodide, 2-(β-acetanilidovinyl)benzoselenazole ethiodide, 1-(δ-anilino-$\Delta^{1,3}$-butadienyl)benzothiazole ethiodide and its δ-anilino-γ-bromo-$\Delta^{1,3}$-butadienyl analogues, 2-(β-acetanilidovinyl)-1,3-diethylbenzimidazolium iodide, etc.

Some of the dyes represented by Formula I, either in the form of the free bases or their quaternized derivatives, have been found to be especially useful as non-staining, strongly sensitizing dyes in photographic materials. The free base of some of the dyes of Formula I where $d$ equals 2, unlike analogous dyes containing an acidic nucleus as the keto nucleus, have been found to be stable toward the usual developers. However, quaternization of these dyes, as hereinafter described, gives a product which can be easily bleached by the usual photographic materials.

As noted above, the pyrimidazolones represented by Formula IV are used in the form of their alkali metal (e. g. sodium, potassium, etc.) salts or acid addition salts. The acid addition salts represented by the following formula:

VII

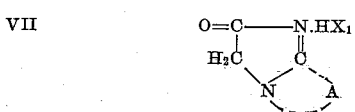

wherein A has the value set forth above and $X_1$ represents a halogen atom (e. g. a chlorine atom, a bromine atom, etc.) have been found to be especially useful, owing to their greater stability.

Pyrimidazolone hydrochloride or hydrochromide may be prepared according to the methods of Chichibabin (Ber., 1924, 57B, 2092) either by treating 2-imino-1,2-dihydropyridine-1-acetic acid with concentrated mineral acids, or by heating 2-halogenoacetamidopyridine, for example, 2-bromoacetamidopyridine, in a suitable solvent such as n-butyl alcohol. Sodium pyrimidazolone may be prepared by the methods of Reindel (Ber., 1924, 57B, 1381).

The methine dyes of my invention represented by Formula II can advantageously be prepared by condensing an alkali metal salt form or acid addition salt (i. e. the compounds of Formula VII) of one of the pyrimidazolone compounds represented by Formula IV with one of compounds selected from those represented by Formula VI, in the presence or absence of a carboxylic acid anhydride, e. g. acetic anhydride, propionic anhydride, n-butyric anhydride, etc.

Typical compounds represented by Formula VI include β-ethoxyacraldehyde diethyl acetal, β-anilinoacraldehyde anil, δ-anilinoglutaconic aldehyde anil, β-anilino-α-halogenoacraldehyde anils (e. g. β-anilino-α-bromoacraldehyde anil, β-anilino-α-chloroacraldehyde anil, or their hydrochlorides; etc.), α-alkyl-β-anilinoacraldehyde anils (e. g. β-anilino-α-methylacraldehyde anil, etc.), etc.

Among the dyes represented by Formula II, those represented by the formula:

VIII 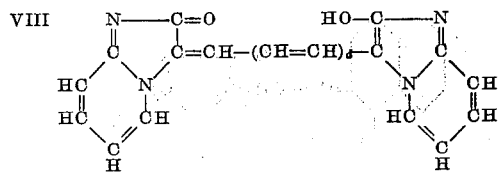

wherein $d$ has the values set forth above, have been found to have unusual properties in that they are not bleached by normal developing agents. These dyes are also stable, and can be used as fabric dyes with the help of a mordant. The dyes represented by Formula VIII can easily be quaternized, and it has been found that, where $d$ equals 2 in the above formula, the quaternized dyes are bleached by the usual developing agents. On the other hand, quaternization of the dye represented by Formula VIII where $d$ equals 1, does not give a product which can be bleached by the usual developing agents. Quaternization of the dyes of Formula VIII, where $d$ equals 2, gives dyes which can be represented by the following general formula:

IX 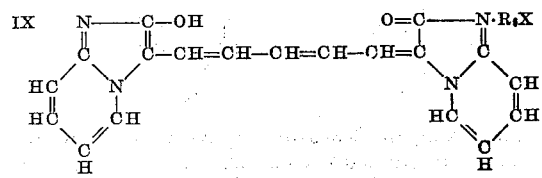

wherein X has the values set forth above, and $R_6$ represents an alkyl group, e. g. methyl, ethyl, n-propyl, isopropyl, n-butyl, isobutyl, benzyl, etc. groups.

Other dyes represented by Formula II which I have found to be especially useful include those represented by the following general formula:

X 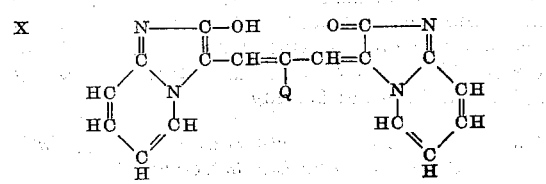

wherein Q represents a halogen atom (e. g. a chlorine atom, a bromine atom, etc.) or an alkyl group (e. g. a methyl group). Where Q represents a halogen atom, the dyes are not bleached by the usual developing agents, although these dyes can be quaternized to give a dye which can be so bleached. The dyes represented by Formula X, where Q represents an alkyl group, such as a methyl group, can be bleached by the ordinary photographic developing agents.

The manufacture of the dyes of my invention either by the condensation of the compounds of Formula III with an alkali metal salt form or acid addition salt of those of Formula IV to give the dyes of Formula I, or the condensation of an alkali metal salt form or acid addition salt of a compound of Formula IV with those of Formula VI to give the dyes of Formula II can advantageously be carried out in the presence of a basic condensing agent, i. e. an acid binding agent, e. g. the trialkylamines, such as triethylamine, tri-n-propylamine, triisopropylamine, tri-n-butylamine, etc., heterocyclic amines, such as N-alkylpiperidines, e. g. N-methyl- and N-ethyl piperidine, etc. Alkali metal salts of carboxylic acids, e. g. sodium acetate, etc. are also useful. Alkali metal carbonates, e. g. sodium carbonate can also be used as an acid-binding agent in my invention. Heat accelerates the condensations, and temperatures varying from about 25° C. to the reflux temperature of the reactants can be used. The condensations can also be carried out in the presence or absence of an inert diluent, if desired. Typical diluents include, for example, the lower aliphatic alcohols (e. g. one to four carbon atoms), such as ethyl, isopropyl, n-propyl, n-butyl, etc. alcohols, pyridine, benzene, etc. The diluent should be inert toward the dyes formed, and is advantageously chosen so that the dye formed will separate therefrom at least upon cooling the reaction mixture.

The following examples will serve to illustrate more fully the manner whereby I practice my invention.

*Example 1.*—[2-(1-ethylquinoline)]-(3-pyrimidazolone)dimethinemerocyanine

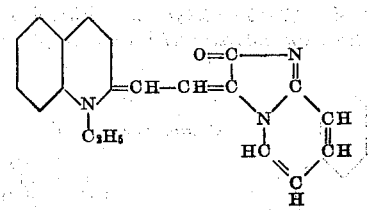

4.9 grams of 2-β-acetanilidovinylquinoline ethiodide, 2.15 grams of pyrimidazolone hydrobromide, 50 cc. of ethanol, and 2 cc. of triethylamine were refluxed together for two minutes. On cooling, the hydrobromide of the required dye separated as golden crystals, M. P.>300° C. The crystals were filtered off and boiled up twice with ethanol in which they were sparingly soluble. The salt was then dissolved in alcoholic triethylamine by heating, and water added which precipitated the dye in a crystalline form. The crystals were collected on a filter, dried, dissolved in hot ethanol, and ether added slowly until crystallization commenced. On slow cooling, the dye (base) was obtained as needles with a green reflex, M. P. 268° C. (decomp.). It sensitized a silver bromiodide emulsion with a maximum at 580 mμ.

*Example 2.*—[2-(3-ethylbenzoxazole)]-(3-pyrimidazolone)dimethinemerocyanine

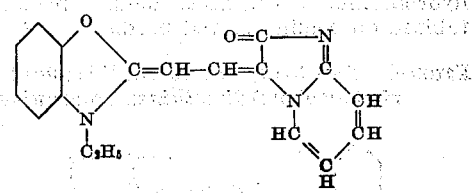

4.34 grams of 2-β-acetanilidovinylbenzoxazole ethiodide, 2.15 grams of pyrimidazolone hydrobromide, 25 cc. of ethanol, and 2.8 cc. of triethylamine were refluxed together for 30 minutes, and the solution concentrated to half volume and allowed to stand overnight. The hydrobromide of the required dye crystallized and was filtered off, and then recrystallized from ethanol in the form of red needles, M. P. 202° C. This salt strongly sensitized a silver chloride emulsion with a maximum at 530 mμ. The base was prepared from the salt by the methods described in Example 1, forming orange crystals, M. P. 269° C.

*Example 3.*—[2-(3-ethylthiazoline)]-(3-pyrimidazolone)dimethinemerocyanine

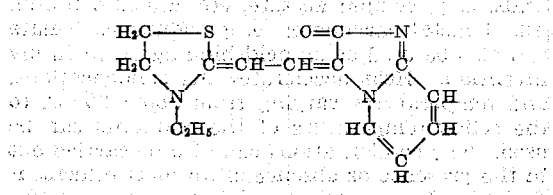

4 grams of 2-β-acetanilidovinylthiazoline ethiodide, 2.15 grams of pyrimidazolone hydrobromide, 2.8 cc. of triethylamine, and ethanol were refluxed together for 30 minutes and the solution then concentrated to quarter-volume. The hydrobromide crystallized on cooling, and was filtered off. It was then dissolved in ethanol and a few drops of a 40% acetic acid solution of hydrogen bromide added. On cooling, the hydrobromide separated as orange rosettes, M. P. 236° C. It sensitized a silver chloride emulsion strongly with a maximum at 550 mμ.

*Example 4.*—[2-(3-ethylbenzothiazole)]-(3-pyrimidazolone)dimethinemerocyanine 4.5 grams of 2-β-acetanilidovinylbenzothiazole ethiodide, 2.15 grams of pyrimidazolone hydrobromide, 25 cc. of ethanol, and 2.8 cc. of triethylamine were refluxed together for 30 minutes, and the solution then concentrated to half-volume. Crystals precipitated on chilling, which were collected and dissolved in ethanol with the addition of triethylamine. The addition of an aqueous sodium carbonate solution precipitated the dye (base) which was collected, washed, dried, and recrystallized by dissolving in hot ethanol, adding ether until crystallization commenced and then slowly chilling. The dye (base) formed small green crystals, M. P. 271° C. and was a powerful sensitizer for silver chloride emmulsions, with a maximum at 565 mμ. The hydrobromide was obtained from the dye (base) by dissolving the latter in hot ethanol and adding excess of 40% hydrobromic acid in acetic acid. The salt crystallized on cooling as red needles, M. P. 309° C.

*Example 5.*—[2-(3-ethylbenzothiazole)]-(3-pyrimidazolone)dimethinemerocyanine 4.5 grams of 2-β-acetanilidovinylbenzothiazole ethiodide, 1.6 grams of sodium pyrimidazolone and 25 cc. of ethanol were refluxed together for 30 minutes, and then the alcohol distilled off. 100 cc. of water were added to the remainder, and the mixture heated on the steam bath until the dye crystallized. It was collected after cooling, dried and recrystallized from ethanol-ether, forming purple needles or green crystals, M. P. 271° C.

*Example 6.*—[2-(1-ethylquinoline)]-(3-pyrimidazolone)dimethinemerocyanine

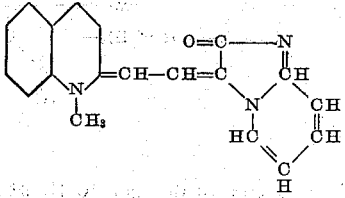

4.9 grams of 2-β-acetanilidovinylquinoline ethiodide, 1.6 grams of sodium pyrimidazolone, and 25 cc. of ethanol were refluxed together for 30 minutes, and water added to precipitate the dye (base). It was collected, washed with water, dried and recrystallized from ethanol-ether forming needles M. P. 268° C.

*Example 7.*—[2-(1-methylpyridine)]-(3-pyrimidazolone)dimethinemerocyanine

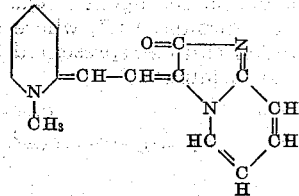

3.5 grams of 2-β-anilinovinylpyridine methiodide were refluxed with 15 cc. of acetic anhydride for 15 minutes, the solution chilled and the acetyl-derivative precipitated with ether, and the ether decanted off. 1.7 grams of pyrimidazolone hydrochloride, 1.6 grams of sodium acetate, and 25 cc. of ethanol added, and the mixture refluxed for 30 minutes. The alcohol was then distilled off, and the residue dissolved in hot water and the solution chilled. The dye (base) precipitated and was collected and recrystallized from hot water forming purple needles, M. P. 245° C. It sensitized a silver chloride emulsion strongly with a maximum at 550 mμ.

*Example 8.*—[4-(1-ethylpyridine)]-(3-pyrimidazolone)dimethinemerocyanine

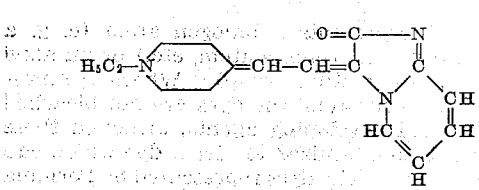

3.5 grams of 4-β-anilinovinylpyridine ethiodide were acetylated by the method of Example 7. 2.0 grams of pyrimidazolone hydrobromide, 25 cc. ethanol, and 2.6 cc. of triethylamine were added and the mixture refluxed for 30 minutes. The resulting solution was allowed to stand overnight when the dye (salt) crystallized. This was collected, dissolved in hot water, excess triethylamine added, and the solution chilled to precipitate the dye (base). It was recrystallized from hot water forming red needles containing water of crystallization. Drying the needles over potassium hydroxide gave a green powder, M. P. 250° C. It sensitized a silver chloride emulsion with a maximum at 560 mμ.

*Example 9.—[2-(3-ethylbenzoxazole)]-(3-pyrimidazolone)tetramethinemerocyanine*

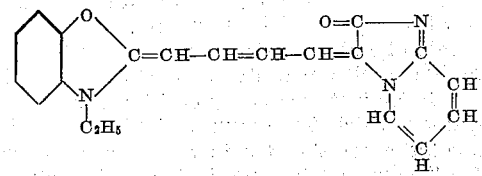

9 grams of δ-acetanilido-Δ^{1,3}-butadienylbenzoxazole ethiodide, 3.5 grams of pyrimidazolone hydrochloride, 25 cc. of ethanol and 5.6 cc. of triethylamine were refluxed together for 30 minutes. The dye was collected, dissolved in aqueous triethylamine and the amine removed by heating under reduced pressure. On cooling, the dye (base) formed greenish crystals, M. P. 300° C.

The dye was quaternized by fusing 3.3 grams thereof with 3.7 grams of methyl p-toluenesulfonate for 20 minutes at 112° C. and cooling. The resulting solid was boiled up with benzene, collected and recrystallized from ethanol as dark brassy crystals, M. P. 300° C. It showed absorption maxima of 585 m$\mu$ (water) and 600 m$\mu$ (alcohol).

*Example 10.—3,3'-bis-pyrimidazolonetrimethineoxonol*

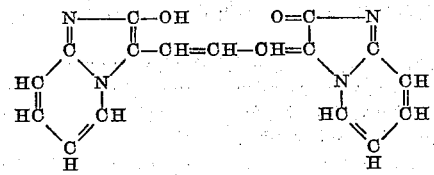

2 grams of pyrimidazolone hydrochloride, 1 gram of β-ethoxyacraldehyde diethyl acetal, 20 cc. of ethanol, and 2 cc. of triethylamine were refluxed together for 30 minutes. The triethylamine can be omitted, if desired. The dye (salt) was collected after cooling, and dissolving in boiling water containing an excess of triethylamine. Impurities were removed by filtration, and the blue solution concentrated under reduced pressure. As the triethylamine boiled off, the dye (base) precipitated in the form of purple needles, M. P. 284° C. The yield was 1.9 grams, and the dye showed a maximum absorption in methanol of 600 m$\mu$.

1 gram of dye was quaternized by fusing with 2 grams of methyl p-toluenesulfonate for 20 minutes at 110° C. The resultant solid was boiled up with benzene, filtered off, and boiled with acetone giving bright green, water-soluble crystals, which showed absorption maxima of 595 m$\mu$ (water), and 585 m$\mu$ (methanol).

*Example 11.—3,3'-bis-pyrimidazolonepentamethineoxonol*

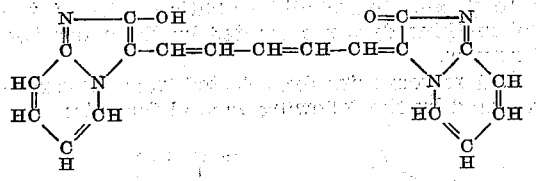

2.4 grams of pyrimidazolone hydrochloride, 2.8 grams of δ-anilinoglutaconic aldehyde anil hydrochloride, 40 cc. of ethanol, and 8.4 cc. of triethylamine were shaken together at room temperature for 15 minutes, and then heated on a steam bath for 30 minutes. 2.45 grams of the dye (hydrochloride) were obtained on cooling, as green crystals, M. P. 218° C. (decomp.). The salt was heated and stirred with aqueous 2 N sodium carbonate to give green needles of the base, which were washed with water, alcohol and ether. The dye showed a maximum absorption of 590 m$\mu$ (methanol).

The dye was quaternized by fusing 1.1 grams thereof with 2.5 grams of methyl p-toluenesulfonate for 15 minutes at 110° C. The resultant solid was boiled up with benzene to give 2.4 grams of green crystals (100% yield). It was recrystallized from methanol forming bright green crystals, M. P. 269° C. It showed absorption maxima of 658 m$\mu$ (water) and 685 m$\mu$ (methanol).

Aqueous potassium iodide or bromide can be added to an aqueous solution of the quaternized dye to give the methohalides, which are less soluble.

The dye was also quaternized by fusing 1 molecular equivalent thereof with 4 molecular equivalents of ethyl p-toluenesulfonate for 30 minutes at 120° C. to give the etho-p-toluenesulfonate. This is more soluble than the metho-p-toluenesulfonate. The ethiodide and ethobromide can also be formed by the methods described above for the methiodide and methobromide, and are sparingly soluble in water.

*Example 12.—3,3'-bis-pyrimidazolonemesomethyltrimethineoxonol*

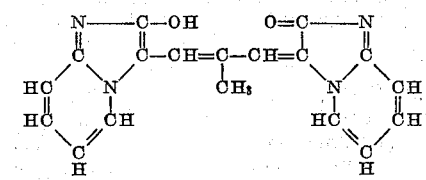

1.35 grams of pyrimidazolone hydrochloride, 1.1 grams of α-methyl-β-anilinoacraldehyde anil hydrochloride, 50 cc. of ethanol and 50 cc. of aqueous 2 N sodium carbonate were heated together at 70° C. for 5 minutes, chilled and allowed to stand overnight. The resulting precipitate was filtered off and washed, leaving 0.5 gram of purple dye. On recrystallization from hot water, brown needles of dye were formed of M. P. 235° C. showing an absorption maximum of 600 m$\mu$ (methanol).

*Example 13.—3,3'-bis-pyrimidazolonemesochlorotrimethineoxonol*

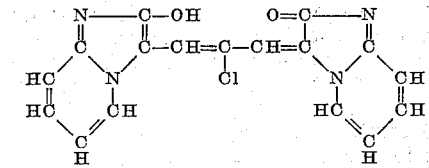

3.4 grams of pyrimidazolone hydrochloride, 2.6 grams of α-chloro-β-anilinoacraldehyde anil, 30 cc. of ethanol and 45 cc. of aqueous 2 N sodium carbonate were heated together on a steam bath for 20 minutes. The dye crystallized during this time, and was collected and boiled up with ethanol, when 2.7 grams (80% yield) of dye were obtained as purple crystals, M. P. 300° C. The dye was water-soluble and showed absorption maxima of 592 m$\mu$ (water) and 602 m$\mu$ (methanol).

The dye was quaternized by fusing 1.7 grams thereof with 4 grams of methyl p-toluenesulfonate for 20 minutes at 120° C. The resultant solid was boiled up with benzene giving 2.1 grams of the metho-p-toluenesulfonate (100% yield of the mono-quaternary salt), as a steel grey powder, M. P. 300° C. which was decomposed by prolonged boiling in methanol. It showed absorption maxima at 590 m$\mu$ (water) and 600 m$\mu$ (methanol).

*Example 14.—3,3'-bis-pyrimidazolonemesobromo-trimethineoxonol*

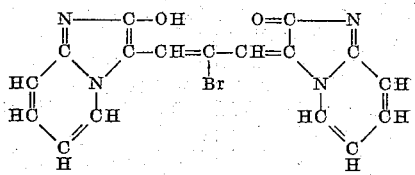

3.4 grams of pyrimidazolone hydrochloride, 3 grams of α-bromo-β-anilinoacraldehyde anil and 30 cc. of ethanol were heated until no solid matter remained, 45 cc. of aqueous 2 N sodium carbonate added, and the whole heated on a steam bath for 20 minutes.

The dye was collected after cooling and washed with alcohol and water.

0.5 gram of the dye was quaternized by fusing with 1.8 grams of methyl p-toluenesulfonate at 120° C. for 20 minutes. The resultant solid was boiled up with benzene and recrystallized from ethanol, forming bronze crystals, M. P. 300° C. the quaternized dye showed absorption maxima of 587 mμ (water) and 600 mμ (methanol).

In a manner similar to that illustrated in the above examples, other dyes coming within the scope of my invention can be prepared. For example, by replacing the β-acetanilido compounds of Examples 1 to 8 by a molecularly equivalent amount of 2-(β-acetanilidovinyl)benzoselenazole ethiodide, [2-(3 - ethylbenzoselenazole)]-(3 - pyrimidazolone)dimethinemerocyanine can be obtained. Similarly replacing the β-acetanilido compound of Example 1 with a molecularly equivalent amount of 2-(δ-acetanilidovinyl)benzothiazole methiodide gives [2-(3-methyl-benzothiazole)] - (3 - pyrimidazolone)dimethinemerocyanine. The pyridine nucleus of the pyrimidazolone dyes of my invention can be substituted by various groups, e. g. Cl, Br, OH, CH₃, C₂H₅, etc.

The sensitivity of photographic silver-halide emulsions can be altered by many of the dyes of this invention. Sensitization by means of my new dyes if, of course, directed primarily to the ordinarily employed gelatino-silver-halide developing-out emulsions. The dyes are advantageously incorporated in the washed, finished emulsion and should, of course, be uniformly distributed throughout the emulsions.

In the preparation of photographic emulsions containing these new dyes, it is only necessary to disperse, homogeneously and uniformly, from about 5 to about 100 mg. of the dye or mixture of dyes in about 1000 cc. of the flowable emulsion, the concentration of dye being varied according to the type of light-sensitive salt which goes to make up the emulsion and according to the effects desired. The suitable and most economical concentration for any given emulsion will be apparent to those skilled in the art, upon making the ordinary tests and observations, customarily used in the art of emulsion-making. To prepare a gelatino-silver-halide emulsion, the following procedure is satisfactory: A quantity of the dye is dissolved in methyl alcohol and a volume of this solution (which may be diluted with water) containing from 5 to 100 mg. of dye is slowly added to about 1000 cc. of a gelatino-silver-halide emulsion with stirring. Stirring is continued until the dye is uniformly and practically homogeneously dispersed. With the more powerful of these new sensitizing dyes 10 to 20 mg. of dye per 1000 cc. of emulsion suffice to produce the maximum sensitizing effect with the ordinary gelatino-silver-halide emulsions. The above statements are only illustrative and not to be understood as limiting my invention in any sense, as it will be apparent that these dyes can be incorporated by other methods in many of the photographic emulsions customarily employed in the art, such for instance as by bathing the plate or film, upon which the emulsion has been coated, in a solution of the dye in an appropriate solvent, although such a method is ordinarily not to be preferred. The claims are intended to cover any combination of these new dyes with a photographic silver salt emulsion whereby the dye exerts a sensitizing effect upon the emulsions as well as a photographic element comprising a support, ordinarily transparent, upon which the light-sensitive emulsion is coated or spread and permitted to set or dry.

For the preparation of overcoating layers, filter layers, and antihalation layers embodying the dyes of my invention (especially those of the oxonol and merocyanine series), according to this invention, from 50 mg. to 150 mg. of dye are dissolved in from 2 to 5 cc. of a water-miscible solvent. Methanol or acetone are suitable for this purpose, but pyridine or β-ethoxyethanol (Cellosolve) can be also be used. The solution is then added to about 25 cc. of a 5 per cent gelatin solution at 40° C. and the mixture coated on the support.

As noted above, some of the dyes of this invention can also be advantageously used as coloring matters for textiles, particularly cellulose acetate, silk, or the like.

What I claim as my invention and desire secured by Letters Patent of the United States is:

1. A methine dye selected from the group consisting of those represented by the following two general formulas:

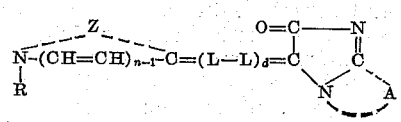

and

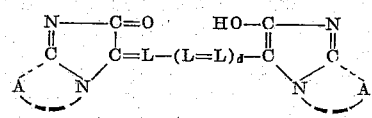

wherein R represents an alkyl group, L represents a methine group, A represents the non-metallic atoms necessary to complete a pyridine nucleus, Z represents the non-metallic atoms necessary to complete a heterocyclic nucleus containing from 5 to 6 atoms in the ring, and $d$ and $n$ each represents a positive integer from 1 to 2, and hydrohalide addition salts of the polymethine dyes represented by the above two formulas.

2. A merocyanine dye selected from those represented by the following general formula:

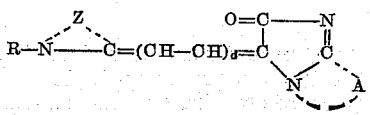

wherein R represents a primary alkyl group of the formula $C_nH_{2n+1}$ wherein $n$ represents a positive integer from 1 to 4, $d$ represents a positive integer from 1 to 2, Z represents the non-metallic atoms necessary to complete a heterocyclic nucleus of the thiazoline series, and A represents the non-metallic atoms necessary to complete a heterocyclic nucleus of the pyridine series.

3. A merocyanine dye selected from those represented by the following general formula:

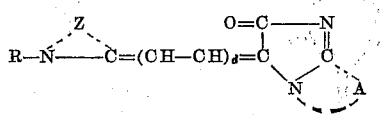

wherein R represents a primary alkyl group of the formula $C_nH_{2n+1}$ wherein $n$ represents a positive integer from 1 to 4, $d$ represents a positive integer from 1 to 2, Z represents the non-metallic atoms necessary to complete a heterocyclic nucleus of the benzothiazole series, and A represents the non-metallic atoms necessary to complete a heterocyclic nucleus of the pyridine series.

4. A merocyanine dye selected from those represented by the following general formula:

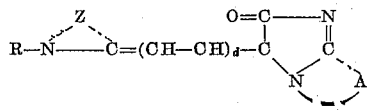

wherein R represents a primary alkyl group of the formula $C_nH_{2n+1}$ wherein $n$ represents a positive integer from 1 to 4, $d$ represents a positive integer from 1 to 2, Z represents the non-metallic atoms necessary to complete a heterocyclic nucleus of the benzoxazole series, and A represents the non-metallic atoms necessary to complete a heterocyclic nucleus of the pyridine series.

5. A merocyanine dye selected from those represented by the following general formula:

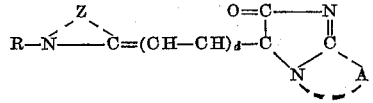

wherein R represents a primary alkyl group of the formula $C_nH_{2n+1}$ wherein $n$ represents a positive integer from 1 to 4, $d$ represents a positive integer from 1 to 2, Z represents the non-metallic atoms necessary to complete a heterocyclic nucleus of the quinoline series, and A represents the non-metallic atoms necessary to complete a heterocyclic nucleus of the pyridine series.

6. The merocyanine dye represented by the formula:

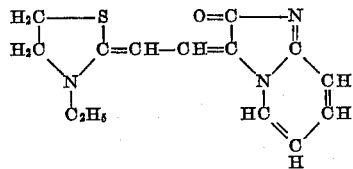

7. The merocyanine dye represented by the formula:

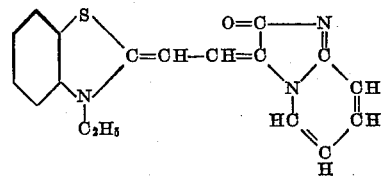

8. The merocyanine dye represented by the formula:

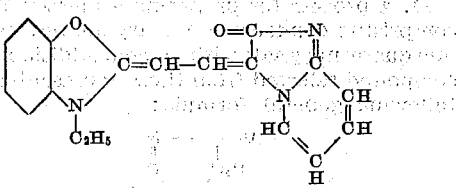

9. The merocyanine dye represented by the formula:

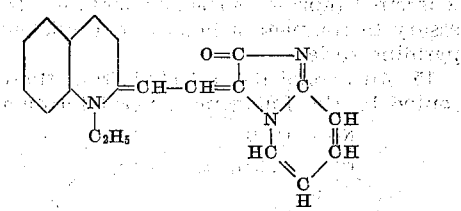

10. A process for preparing a merocyanine dye comprising condensing a cyclammonium quaternary salt, containing in a position selected from the group consisting of the α- and γ-positions, a reactive group selected from the group consisting of a 2-arylamino-vinyl group and a 4-arylamino-1,3-butadienyl group, with a member selected from the group consisting of acid addition salts and alkali metal salt forms of a compound selected from those represented by the following general formula:

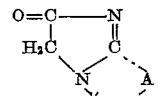

wherein A represents the non-metallic atoms necessary to complete a pyridine nucleus.

11. A process for preparing a merocyanine dye comprising condensing a 2-arylaminovinylthiazoline quaternary salt with an acid addition salt of a compound selected from those represented by the following general formula:

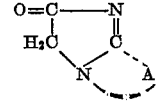

wherein A represents the non-metallic atoms necessary to complete a heterocyclic nucleus of the pyridine series.

12. A process for preparing a merocyanine dye comprising condensing a 2-arylaminovinylbenzothiazole quaternary salt with an acid addition salt of a compound selected from those represented by the following general formula:

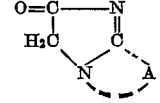

wherein A represents the non-metallic atoms necessary to complete a heterocyclic nucleus of the pyridine series.

13. A process for preparing a merocyanine dye comprising condensing a 2-arylaminovinylbenzoxazole quaternary salt with an acid addition salt of a compound selected from those represented by the following general formula:

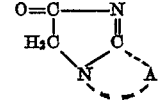

wherein A represents the non-metallic atoms necessary to complete a heterocyclic nucleus of the pyridine series.

14. A process for preparing a merocyanine dye comprising condensing a 2-arylaminovinylquinoline quaternary salt with an acid addition salt of a compound selected from those represented by the following general formula:

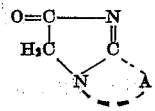

wherein A represents the non-metallic atoms necessary to complete a heterocyclic nucleus of the pyridine series.

15. An oxonol dye selected from those represented by the following general formula:

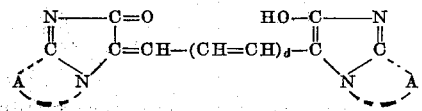

wherein A represents the non-metallic atoms necessary to complete a heterocyclic nucleus of the pyridine series and $d$ represents a positive integer from 1 to 2.

16. The oxonol dye represented by the formula:

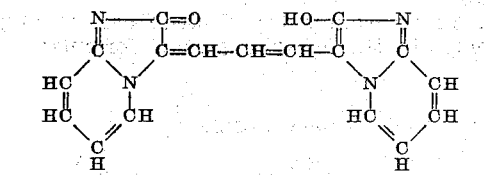

EDWARD BOWES KNOTT.

No references cited.

Certificate of Correction

Patent No. 2,514,649                    July 11, 1950

EDWARD BOWES KNOTT

It is hereby certified that error appears in the printed specification of the above numbered patent requiring correction as follows:

Column 3, lines 26, 27, and 28, for that portion of the formula reading

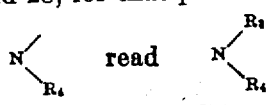

column 3, line 55, in the formula, for "$CH)_{n-1}C$" read $CH)_{n-1}=C$; column 4, line 17, for "benzoazole" read *benzoxazole*; column 7, line 29, for "$CH=CH$" read $CH-CH$; column 8, first formula therein, for "$CH_4$" read $C_2H_5$; same formula, upper right hand portion thereof, for

line 27, for the incorrectly printed letter over "$C$" read $N$; column 13, lines 26 to 30 inclusive, strike out the formula and insert instead the following:

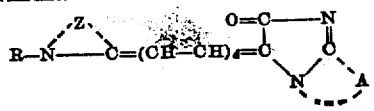

and that the said Letters Patent should be read as corrected above, so that the same may conform to the record of the case in the Patent Office.

Signed and sealed this 24th day of October, A. D. 1950.

[SEAL]

THOMAS F. MURPHY,
*Assistant Commissioner of Patents.*